Nov. 13, 1923. Re. 15,721

F. H. HEADLEY

SPRING SUSPENSION MECHANISM FOR VEHICLES

Original Filed June 1, 1922 2 Sheets-Sheet 1

Inventor
Frederick Hagger Headley
by Arthur A. Nelson Atty.

Nov. 13, 1923. Re. 15,721

F. H. HEADLEY

SPRING SUSPENSION MECHANISM FOR VEHICLES

Original Filed June 1, 1922 2 Sheets-Sheet 2

Inventor
Frederick Hagger Headley
by Arthur W. Nelson
Att'y

Reissued Nov. 13, 1923. Re. 15,721

UNITED STATES PATENT OFFICE.

FREDERICK HAGGER HEADLEY, OF BIRMINGHAM, ENGLAND, ASSIGNOR TO TAN SAD LIMITED, OF BIRMINGHAM, ENGLAND, A COMPANY OF ENGLAND.

SPRING SUSPENSION MECHANISM FOR VEHICLES.

Original No. 1,428,166, dated September 5, 1922, Serial No. 565,216, filed June 1, 1922. Application for reissue filed October 21, 1922. Serial No. 596,131.

*To all whom it may concern:*

Be it known that I, FREDERICK HAGGER HEADLEY, a subject of the King of Great Britain, residing at Kingscroft, 53, Woodlands Road, Northfield, Birmingham, in the county of Warwick, England, have invented Improvements in Spring Suspension Mechanism for Vehicles, of which the following is a specification.

This invention comprises a spring suspension mechanism for vehicles, particularly applicable to perambulators, and the like, in which fore and rear axles extending across the vehicle are each carried by radius arms, one on each side of the vehicle, rigidly secured to the axle, and in which the radius arms at the rear of the vehicle extend rearwardly from their axis to the rear axle of the vehicle, and those in the fore part of the vehicle extend forwardly from their axis to the fore axle of the vehicle.

In order that this invention may be clearly understood and readily carried into practice, reference may be had to the appended explanatory sheet of drawings, upon which:—

Figure 1:
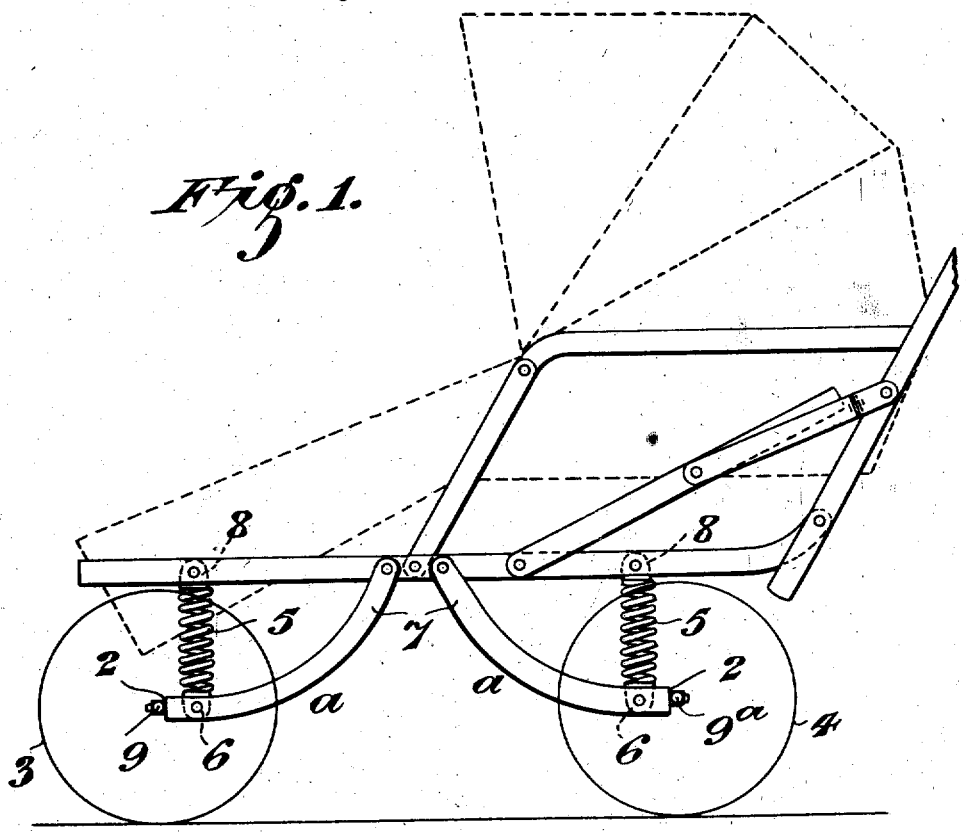
Figure 1 is a side elevation of a perambulator according to this invention.
Figure 2:
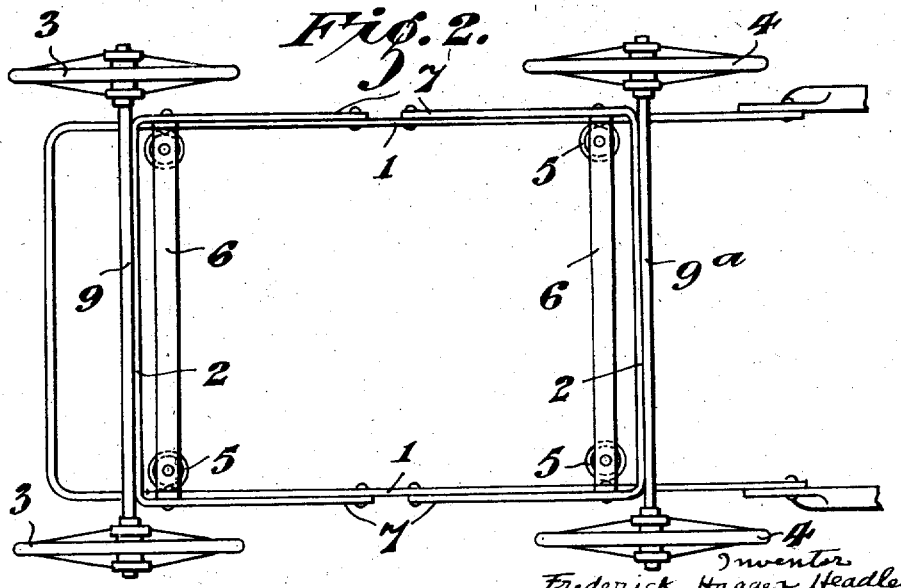
Figure 2 is an inverted plan of certain parts shown in Figure 1.
Figure 3:
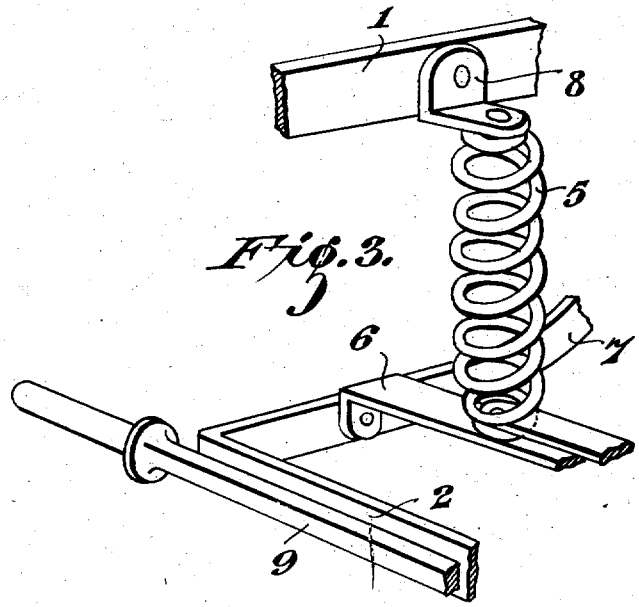
Figure 3 is a detail perspective view showing the method of mounting the springs.

In a convenient embodiment of the present invention, I provide a perambulator having a frame formed with horizontal side stays or limbs 1, to which latter at a mid-position in their length are pivotally connected the extremities of the arms of two U-members *a* at positions in proximity to each other, the transverse parts 2 of which two U-members *a* are secured to the axles 9 and 9ª respectively of the fore and rear wheels 3, 4 of the perambulator. Between these transverse parts 2 of the U-members *a* or adjacent rigid parts appertaining thereto and the perambulator frame, springs 5 are incorporated. These springs 5 are advantageously of the coiled type, being located one on each side of the perambulator at front and rear.

At the bottom the springs 5 are appropriately secured to a transverse stay member 6 which is bent at right angles at each extremity and bolted, riveted or otherwise rigidly secured to the arms 7 of the U-members *a*, and being secured at the top to a bracket or angle piece 8 which is in turn secured to the frame members 1.

Figure 4:
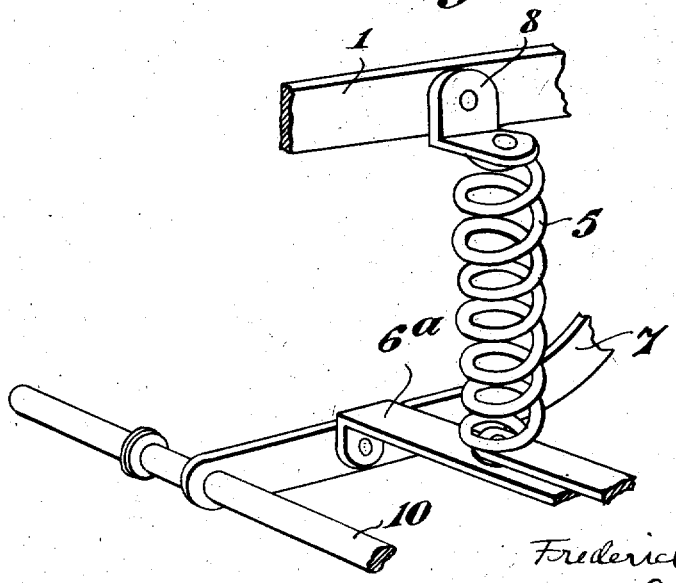
Figure 4 is a detail perspective view of a modification of this invention.

In the modification shown in Figure 4, the transverse part of each U-member may comprise the stay 6ª bent at right angles at each extremity and bolted, riveted, or otherwise rigidly secured to the end of a stay 7 which forms the arm of the U-member. The wheel axle 10 may rigidly be carried by this side stay 7 at a position near to its connection with the said transverse stay 6.

If desired, three or more springs may be provided in connection with the U-members, in which case the brackets 8 may be dispensed with and a transverse member, similar to the member 6, is secured to the frame 1 and the tops of the springs secured thereto.

The body of the perambulator may be collapsible, so that by the present invention a semi-collapsible perambulator is provided in which the wheels are sprung or resiliently suspended in a particularly effectual manner.

What I claim as my invention and desire to secure by Letters Patent is:—

1. In a vehicle, a chassis, front and rear axles, U-members having transverse portions secured to the axles and having end portions which form radius arms arranged longitudinally of the vehicle, the radius arms of the front members extending rearwardly and being pivotally mounted on the chassis, and those of the rear member extending forwardly and being pivotally mounted on the chassis cross bars on the U-members, and springs between the said cross bars and the chassis.

2. In a perambulator the combination of a frame having side portions, two pairs of radius arms, transverse members extending between and connecting said radius arms, each pair being pivotally carried at one end by the frame and one pair extending forwardly from the pivotal connection thereof and the other pair rearwardly from the pivotal connection thereof, front and rear pairs of wheels, axle members upon which said wheels are rotatably mounted, said axle members being connected to the outer ends of the respective radius arms at points transversely inward of the wheel positions, and springs interposed between the frame and the other parts yieldingly to resist movement of said parts relative to the frame.

3. In a perambulator the combination of a frame having side portions, two pairs of radius arms, transverse members extending between and connecting said radius arms, each pair being pivotally carried at one end by the frame and one pair extending forwardly from the pivotal connection thereof and the other pair rearwardly from the pivotal connection thereof, a unitary front axle transversely positioned beneath the front of the frame and a unitary rear axle transversely positioned beneath the rear of the frame, wheels rotatably mounted upon the outer end portions of said unitary axles, the outer ends of the front pair of the radius arms being connected to the front axle inwardly of the wheel positions thereon and the outer end of the rear pair of radius arms being connected to the rear axle inwardly of the wheel position thereon, and springs interposed between the frame and the other parts yieldingly to resist movement of said parts relative to the frame.

4. In a perambulator the combination of a frame having side portions, two pairs of radius arms, each pair being pivotally carried at one end by the frame and one pair extending forwardly from the pivotal connection thereof and curving downwardly and the other pair rearwardly from the pivotal connection thereof and curving downwardly, front and rear pairs of wheels, axle members upon which said wheels are rotatably mounted, said axle members being connected to the outer ends of the respective radius arms at points transversely inward of the wheel positions, and springs interposed between the frame and the other parts yieldingly to resist movement of said parts relative to the frame.

In witness whereof I have hereunto set my hand.

FREDERICK HAGGER HEADLEY.